United States Patent
Rix et al.

(10) Patent No.: US 9,211,675 B2
(45) Date of Patent: Dec. 15, 2015

(54) INSTALLATION FOR FABRICATING PARTS BY SELECTIVE MELTING OF POWDER

(71) Applicant: SNECMA, Paris (FR)

(72) Inventors: Sebastien Rix, Melun (FR); Thomas Vilaro, Melun (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/355,726

(22) PCT Filed: Oct. 23, 2012

(86) PCT No.: PCT/FR2012/052426
§ 371 (c)(1),
(2) Date: May 1, 2014

(87) PCT Pub. No.: WO2013/064767
PCT Pub. Date: May 10, 2013

(65) Prior Publication Data
US 2014/0302188 A1    Oct. 9, 2014

(30) Foreign Application Priority Data

Nov. 3, 2011   (FR) ...................................... 11 59958

(51) Int. Cl.
*B29C 67/00*   (2006.01)
*B29C 67/04*   (2006.01)
*B22F 3/105*   (2006.01)

(52) U.S. Cl.
CPC ......... *B29C 67/0085* (2013.01); *B29C 67/0077* (2013.01); *B22F 2003/1056* (2013.01)

(58) Field of Classification Search
CPC .............. B29C 67/066; B29C 67/0051; B29C 67/0074; B29C 67/0085; B29C 67/0077; B22F 3/00; B22F 3/105

USPC ............... 425/174.4, 174, 385; 264/401, 482, 264/494, 495, 496
See application file for complete search history.

(56) References Cited

U.S. PATENT DOCUMENTS

| | | | |
|---|---|---|---|
| 5,169,579 A | * | 12/1992 | Marcus et al. .................. 264/81 |
| 2007/0188724 A1 | * | 8/2007 | Jacobs et al. .................... 355/53 |
| 2010/0047470 A1 | * | 2/2010 | Abe et al. ....................... 427/553 |
| 2011/0256252 A1 | * | 10/2011 | Amaya et al. ................... 425/78 |
| 2011/0256253 A1 | * | 10/2011 | Amaya et al. ................... 425/78 |

FOREIGN PATENT DOCUMENTS

EP   2 377 670   10/2011

OTHER PUBLICATIONS

Exhibit A. Annotated version of Fig. 8G of US 2007/0188724 A1.*
Support and Connection Types. 1998. Chris H Luebkeman and Donald Peting.*
International Search Report Issued Jan. 24, 2013 in PCT/FR12/052426 Filed Oct. 23, 2012.

* cited by examiner

*Primary Examiner* — James Sanders
*Assistant Examiner* — Leith S Shafi
(74) *Attorney, Agent, or Firm* — Oblon, McClelland, Maier & Neustadt, L.L.P.

(57) ABSTRACT

An installation for fabricating parts by selective melting of powder, the installation including a vessel including a bottom constituted by a movable plate, a mechanism bringing powder into the vessel, and a mechanism generating and moving a laser beam or an electron beam configured to give rise to selective melting of the powder in the vessel. The movable plate includes a tensioning mechanism tensioning in at least one direction parallel its plane.

9 Claims, 1 Drawing Sheet

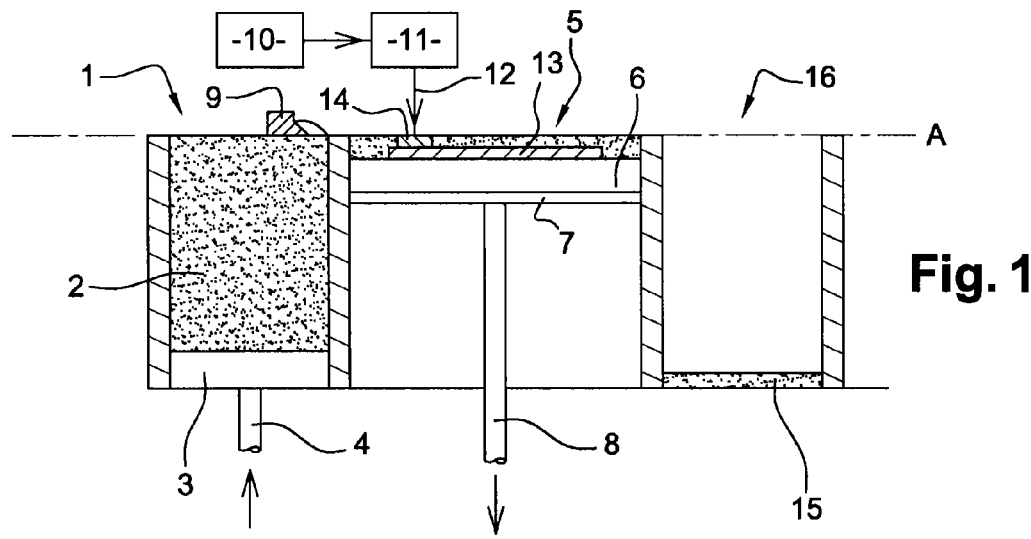
Fig. 1
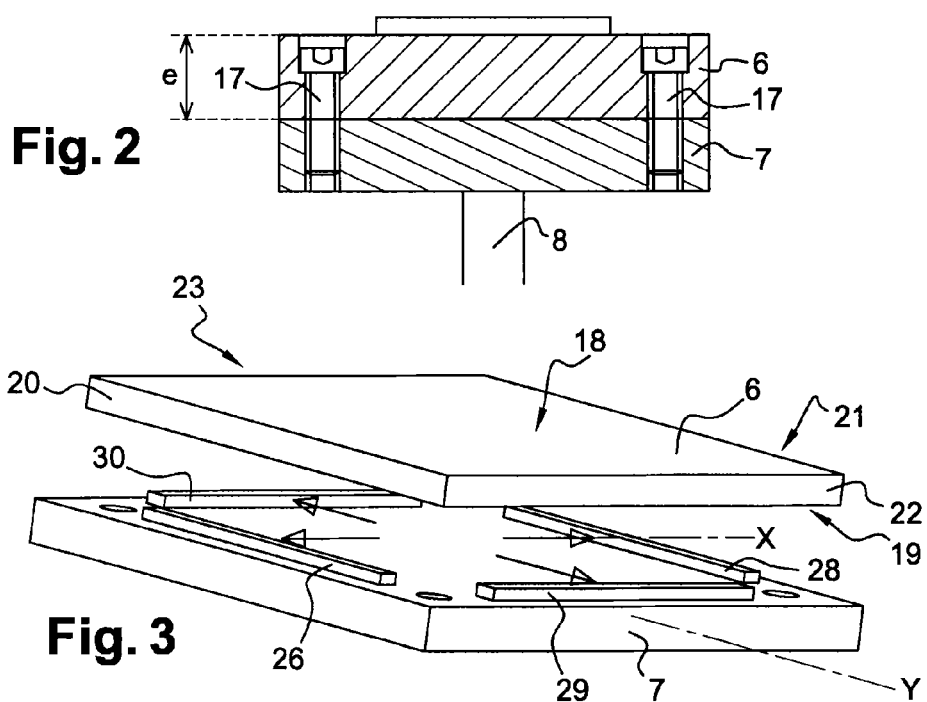
Fig. 2
Fig. 3
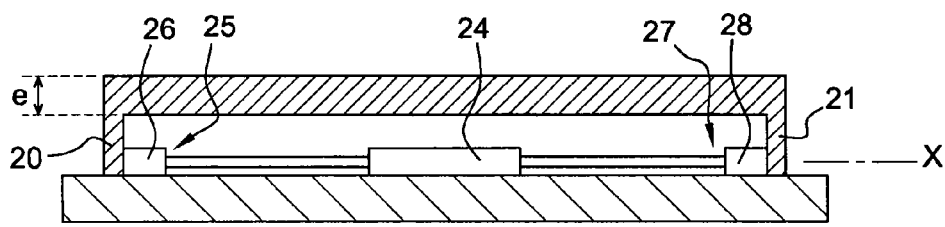
Fig. 4

INSTALLATION FOR FABRICATING PARTS BY SELECTIVE MELTING OF POWDER

BACKGROUND OF THE INVENTION

1 Field of the Invention

The present invention relates to an installation for fabricating parts by selective melting of powder with the help of a laser beam or of an electron beam.

2 Description of the Related Art

Such an installation enables parts to be fabricated with the help of a method known under the name direct metal laser sintering or electron beam melting.

The method consists in fabricating a part by melting successive layers of powder by means of a laser beam or of an electron beam controlled by a data processor system having recorded therein the three-dimensional coordinates of points of successive layers that are to be made. In practical manner, a vessel having a bottom formed by a plate that is movable in vertical translation has a first layer of powder placed on its bottom with the help of a scraper. The layer then presents a bottom surface corresponding to the top surface of the plate and a top surface onto which the laser beam or the electron beam is directed and over which it is moved. The energy delivered by the beam causes the powder to melt locally, and on solidifying the powder forms a first layer of the metal part.

After this first layer has been made, the plate is lowered through a distance corresponding to the thickness of one layer, and then a second layer of powder is brought by the scraper onto the preceding layer. In the same manner as before, a second layer of the metal part is formed by melting with the help of the laser beam or of the electron beam.

These operations are repeated until the entire part has been fabricated.

The movable plate is generally held by screws to a movable support that is itself moved in vertical translation inside the vessel by actuating an actuator.

It is necessary to guarantee that the top surface of the movable plate is plane throughout fabrication of the part. Unfortunately, the successive passes of the laser beam or of the electron beam give rise to thermal stresses in the movable plate, which can lead to the plate deforming if it is not sufficiently rigid.

In order to have rigidity that is sufficient, the movable plate presents considerable thickness, e.g. thickness of about 60 millimeters (mm) for a plate made of INCONEL 718.

The cost of such a plate is very high, and the assembly comprising the movable plate and the part is also very heavy, thus making it difficult to transport.

Finally, the movable plate has very great thermal inertia and therefore requires long heating periods during the heat treatment applied during fabrication or after fabrication, such as for example heat treatment for detensioning or for relieving stresses.

BRIEF SUMMARY OF THE INVENTION

A particular object of the invention is to provide a solution to that problem, which is simple, effective, and inexpensive.

To this end, the invention provides an installation for fabricating parts by selective melting of powder, the invention comprising a vessel having a bottom that is constituted by a movable plate, means for bringing powder into the vessel, and means for generating and moving a laser beam or an electron beam that is designed to give rise to selective melting of the powder in the vessel, the invention being characterized in that it includes tensioning means for tensioning the movable plate in at least one direction parallel to the plane of the plate.

Tensioning the movable plate makes it possible in effective manner to guarantee that it is plane, even when the plate is of small thickness.

The thickness and thus the weight and the thermal inertia of the movable plate can thereby be reduced.

Advantageously, the tensioning means are designed to subject the movable plate to tension forces oriented along two perpendicular directions.

In a preferred embodiment of the invention, the tensioning means comprise at least one actuator applying a force via at least one edge of the movable plate.

The movable plate may also include at least one rim against which the tensioning means bear.

According to a characteristic of the invention, a spacer is mounted between the rim of the movable plate and the tensioning means.

The spacer serves in particular to distribute forces along the rim.

By way of example, the movable plate has thickness lying in the range 3 mm to 10 mm.

Preferably, the tensioning means are mounted on the movable support under the movable plate.

In an embodiment of the invention, the movable plate is of a shape that is rectangular or square, and includes at each of its edges a rim extending downwards, each rim being subjected to a force generated by the tensioning means.

BRIEF DESCRIPTION OF THE SEVERAL VIEWS OF THE DRAWINGS

The invention can be better understood and other details, characteristics, and advantages of the invention appear on reading the following description made by way of non-limiting example and with reference to the accompanying drawing, in which:

FIG. 1 is a diagrammatic view of a prior art installation for fabricating parts by selective melting of powder;

FIG. 2 is a detail view showing how the movable plate is mounted on the movable support in the prior art;

FIG. 3 is a diagrammatic exploded view showing how the movable plate is mounted on the movable support in the invention; and FIG. 4 is a section view showing how the movable plate is mounted on the movable support in the invention.

A known installation for fabricating a metal part by selective melting of a powder is shown in FIG. 1. It comprises a tank 1 containing a metal powder 2 and having a bottom 3 that is movable in vertical translation by means of a rod 4 of an actuator, and an adjacent vessel 5 in which the bottom is constituted by a movable plate 6 that is fastened on a movable support 7, that is likewise movable in vertical translation by a rod 8 of an actuator.

The installation also has a scraper 9 for bringing powder from the tank 1 to the vessel 5 by moving along a horizontal plane A, and means 10 for generating a laser beam or an electron beam, which means are coupled to a device 11 for steering and moving the beam 12.

The steps of fabricating a metal part with the help of that installation are as follows.

Firstly, the bottom 3 of the tank 1 is moved upwards so that a certain quantity of powder 2 lies above the horizontal plane A. The scraper 9 is then moved from left to right so as to scrape said layer of powder 2 coming from the tank 1 and so as to bring it into the vessel 5. The quantity of powder 2 and the position of the plate 6 are determined so as to form a layer of powder of selected and constant thickness, with excess powder 15 being discharged into a vessel 16.

A laser beam or an electron beam 12 then scans a determined zone of the layer formed in the vessel 5 so as to melt the powder 2 locally in the scanned zone. The melted zones solidify so as to form a first layer 13 of the part that is to be fabricated, this layer 13 having thickness lying in the range 10 micrometers (μm) to 100 μm, for example.

The plate 6 is then lowered and a second layer of powder 2 is brought onto the first layer of powder, in the same manner as before. By controlled movement of the beam 12, a second layer 14 of the metal part is formed by melting the powder on the first layer 13.

DETAILED DESCRIPTION OF THE INVENTION

These operations are repeated until the entire part has been made.

As shown in FIG. 2, in the prior art installation, the movable plate 6 is fastened to the movable support 7 by means of bolts 17.

In order to avoid deformation of the movable plate 6 during fabrication of parts, the thickness e of said plate 6 is relatively large, e.g. about 60 mm. As explained above, such a plate is relatively expensive and heavy and it presents significant thermal inertia.

In order to mitigate those drawbacks, the invention proposes fitting the movable plate 6 with tensioning means. The plate 6 is then no longer fastened by screws to the movable support 7.

More particularly, the movable plate 6 is in the shape of a rectangle or a square, having a top face 18 facing into the vessel and a bottom face 19 facing towards the movable support 7.

The bottom face 19 has rims 20, 21, 22, 23 that extend downwards from the peripheral edges of the movable plate 6 towards the movable support 7.

The tensioning means comprise a first hydraulic actuator 24 oriented along an axis X in a horizontal plane. A first end 25 of the first actuator bears against the rim 20 via a spacer 26 extending along the entire length of the rim 20, with a second end 27 of the first actuator 24 bearing against the rim 21 that faces the rim 20 via a spacer 28 that extends along the entire length of the rim 21.

The tensioning means also include a second hydraulic actuator oriented in a horizontal plane along an axis Y that is perpendicular to the axis X. A first end of the second actuator bears against the rim 22 via a spacer 29 extending along the entire length of the rim 22, and a second end of the second actuator bears against the rim 23 facing the rim 22 via a spacer 30 extending along the entire length of the rim 23.

In the embodiment shown, the axes X and Y on which the movable plate is tensioned are parallel to the edges of the plate.

By actuating the actuators, the movable plate is tensioned in the horizontal plane (as shown diagrammatically by arrows in FIG. 3), thereby making it possible to guarantee that it is plane while fabricating parts by selective laser melting of powder, while also reducing its thickness.

By way of example, the movable plate 6 is made of INCONEL 718 and it has thickness e lying in the range 3 mm to 10 mm. The dimensions of the plate 6 along the axes X and Y are respectively 250 mm and 250 mm.

The forces exerted by the first actuator 24 lie in the range 100 newtons (N) to 1000 N, and the forces exerted by the second actuator lie in the range 100 N to 1000 N.

The thickness of the movable plate 6 and the forces applied by the actuators are determined more precisely by strength-of-materials calculations, in particular with the help of the Kirchhof-Love theory.

Naturally, any type of means may be used for tensioning the movable plate, for example screw actuators instead of hydraulic actuators.

The invention claimed is:

1. An installation for fabricating parts by selective melting of powder, comprising:
   a vessel including a bottom constituted by a rectangular movable plate which is moved by a movable support, the movable plate including a top face facing into the vessel and a bottom face facing towards the movable support, the bottom face including first, second, third, and fourth rims which extend downwards from peripheral edges of the movable plate;
   means for bringing powder into the vessel;
   means for generating and moving a laser beam or an electron beam that is configured to give rise to selective melting of the powder in the vessel; and
   tensioning means for tensioning the movable plate in at least one direction parallel to a plane of the movable plate,
   wherein the tensioning means are provided in a space defined by the first, second, third and fourth rims and
   wherein a vertical distance between the bottom face of the movable plate and the movable support is greater than a vertical distance between the bottom face of the movable plate and the tensioning means.

2. An installation according to claim 1, wherein the tensioning means is configured to subject the movable plate to tension forces oriented along first and second directions which are perpendicular to each other.

3. An installation according to claim 2, wherein the tension forces are parallel to two sides of the movable plate.

4. An installation according to claim 1, wherein the tensioning means includes at least one actuator applying a force via at least one edge of the movable plate.

5. An installation according to claim 1, further comprising a force-spreader spacer mounted between the rim of the movable plate and the tensioning means.

6. An installation according to claim 1, wherein the movable plate has a thickness in a range of 3 mm to 10 mm.

7. An installation according to claim 1, wherein the tensioning means is mounted on the movable support under the movable plate.

8. An installation according to claim 1, wherein each rim being subjected to a force generated by the tensioning means.

9. An installation for fabricating parts by selective melting of powder, comprising:
   a vessel including a bottom constituted by a rectangular movable plate which is moved by a movable support, the movable plate including a top face facing into the vessel and a. bottom face facing towards the movable support, the bottom face including first, second, third, and fourth rims which extend downwards from peripheral edges of the movable plate;
   a scraper which brings the powder from a tank into the vessel;
   a device which generates and moves a laser beam or an electron beam that is configured to give rise to selective melting of the powder in the vessel;
   first, second, third, and fourth spacers respectively disposed against each rim of the movable plate;

a first actuator with a first end pressing against the first rim via the first spacer and a second end pressing against the second rim via the second spacer; and a second actuator with a first end pressing against the third rim via the third spacer and a second end pressing against the fourth rim via the fourth spacer, wherein the movable plate is tensioned in a horizontal plane due to forces generated by the first and second actuators, wherein the first and second actuators and the first, second, third, and fourth spacers are provided in a space defined by the first, second, third, and fourth rims, and wherein a vertical distance between the bottom face of the movable plate and the movable support is greater than a vertical distance between the bottom face of the movable plate and an upper surface of one of the first, second, third and fourth spacers.

* * * * *

UNITED STATES PATENT AND TRADEMARK OFFICE
CERTIFICATE OF CORRECTION

| | | |
|---|---|---|
| PATENT NO. | : 9,211,675 B2 | Page 1 of 1 |
| APPLICATION NO. | : 14/355726 | |
| DATED | : December 15, 2015 | |
| INVENTOR(S) | : Sebastien Rix et al. | |

It is certified that error appears in the above-identified patent and that said Letters Patent is hereby corrected as shown below:

In the Claims

Col. 4, line 57, change "and a. bottom face" to --and a bottom face--.

Signed and Sealed this
Twenty-eighth Day of June, 2016

Michelle K. Lee
*Director of the United States Patent and Trademark Office*